Oct. 11, 1938.  H. VANDERWERP  2,132,710
APPARATUS FOR PRODUCING CEMENT CLINKER
Filed March 20, 1937   6 Sheets-Sheet 1
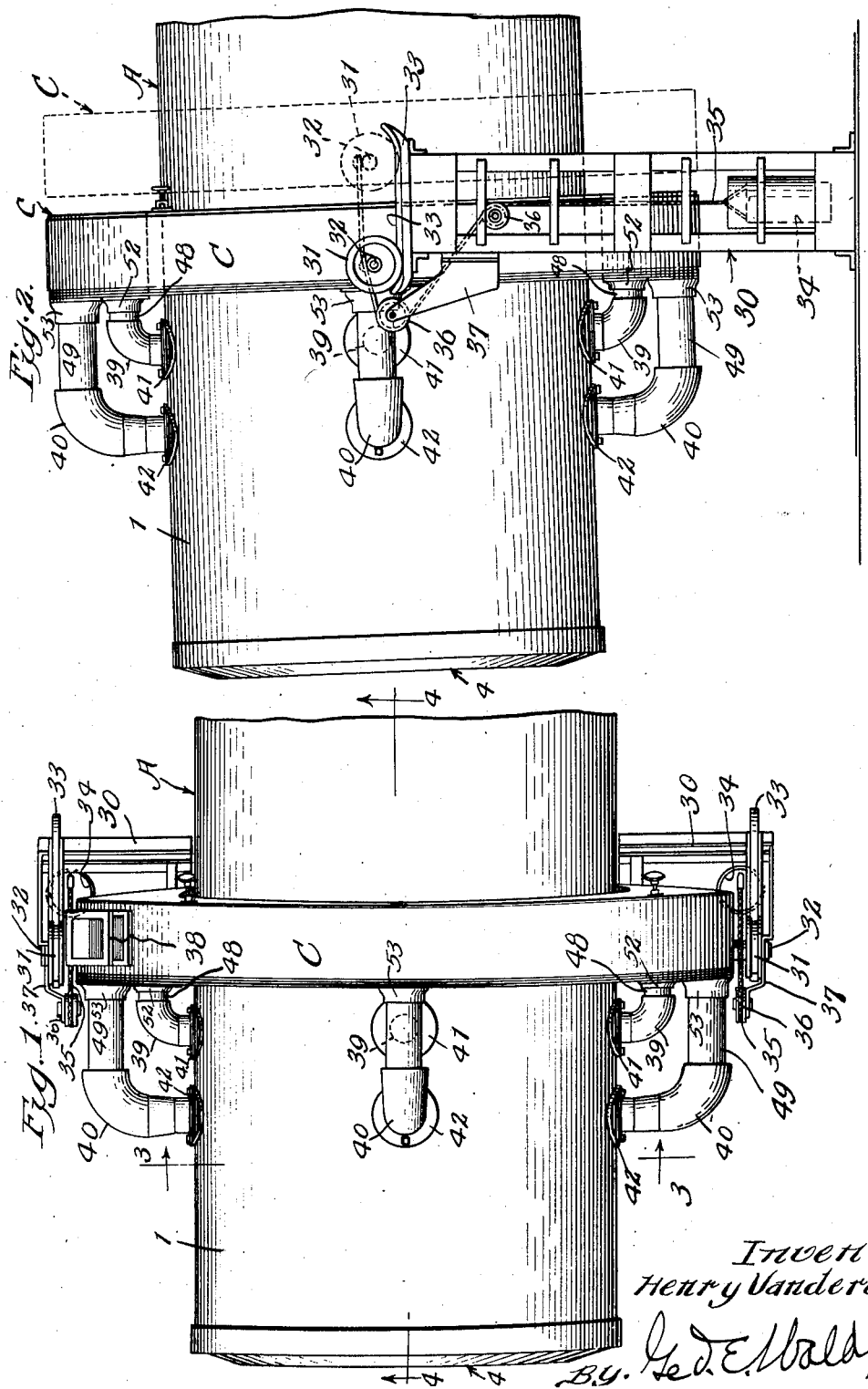
Inventor:
Henry Vanderwerp

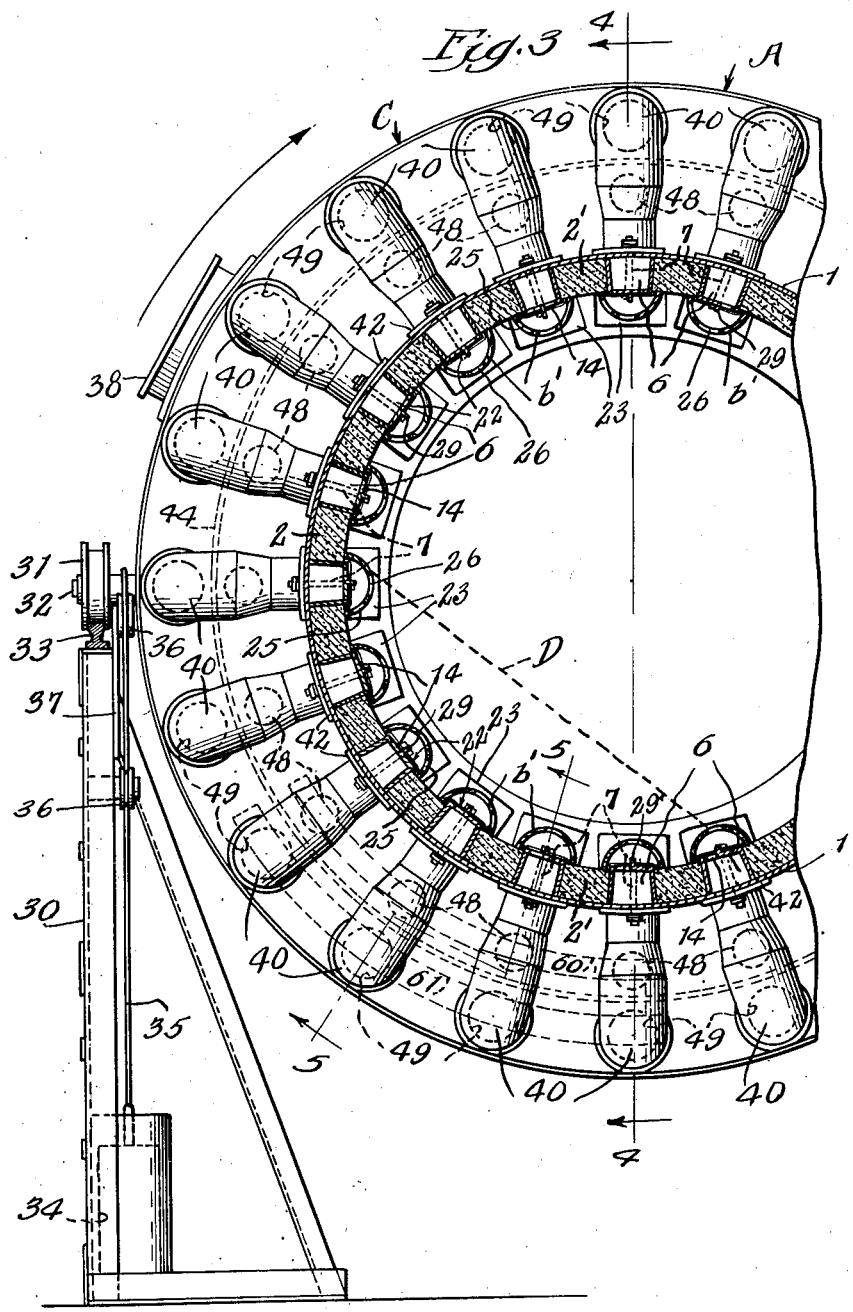

Oct. 11, 1938.   H. VANDERWERP   2,132,710
APPARATUS FOR PRODUCING CEMENT CLINKER
Filed March 20, 1937   6 Sheets-Sheet 3
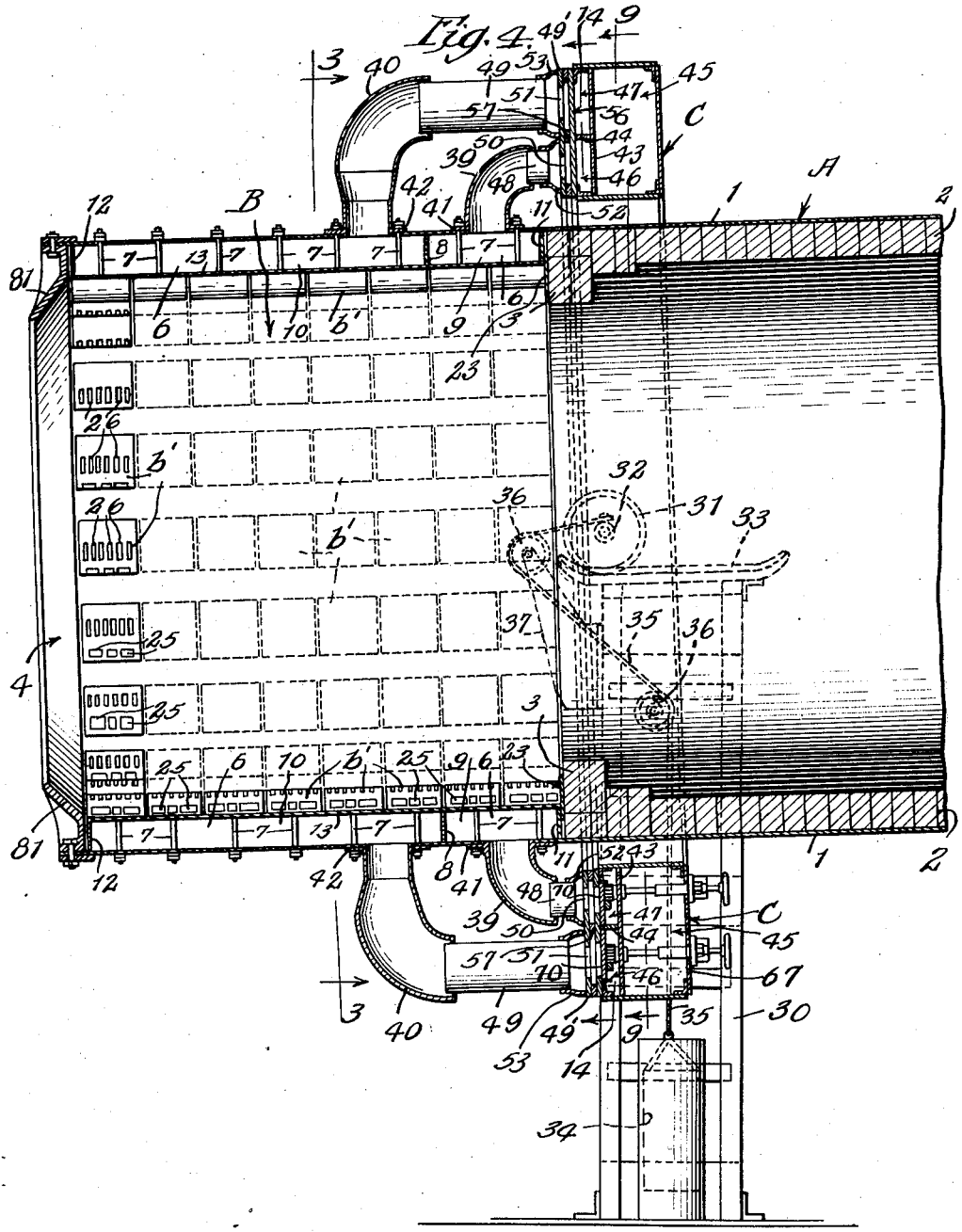
Inventor:
Henry Vanderwerp
By Geo. E. Waldo, Atty Oct. 11, 1938.  H. VANDERWERP  2,132,710
APPARATUS FOR PRODUCING CEMENT CLINKER
Filed March 20, 1937  6 Sheets-Sheet 4
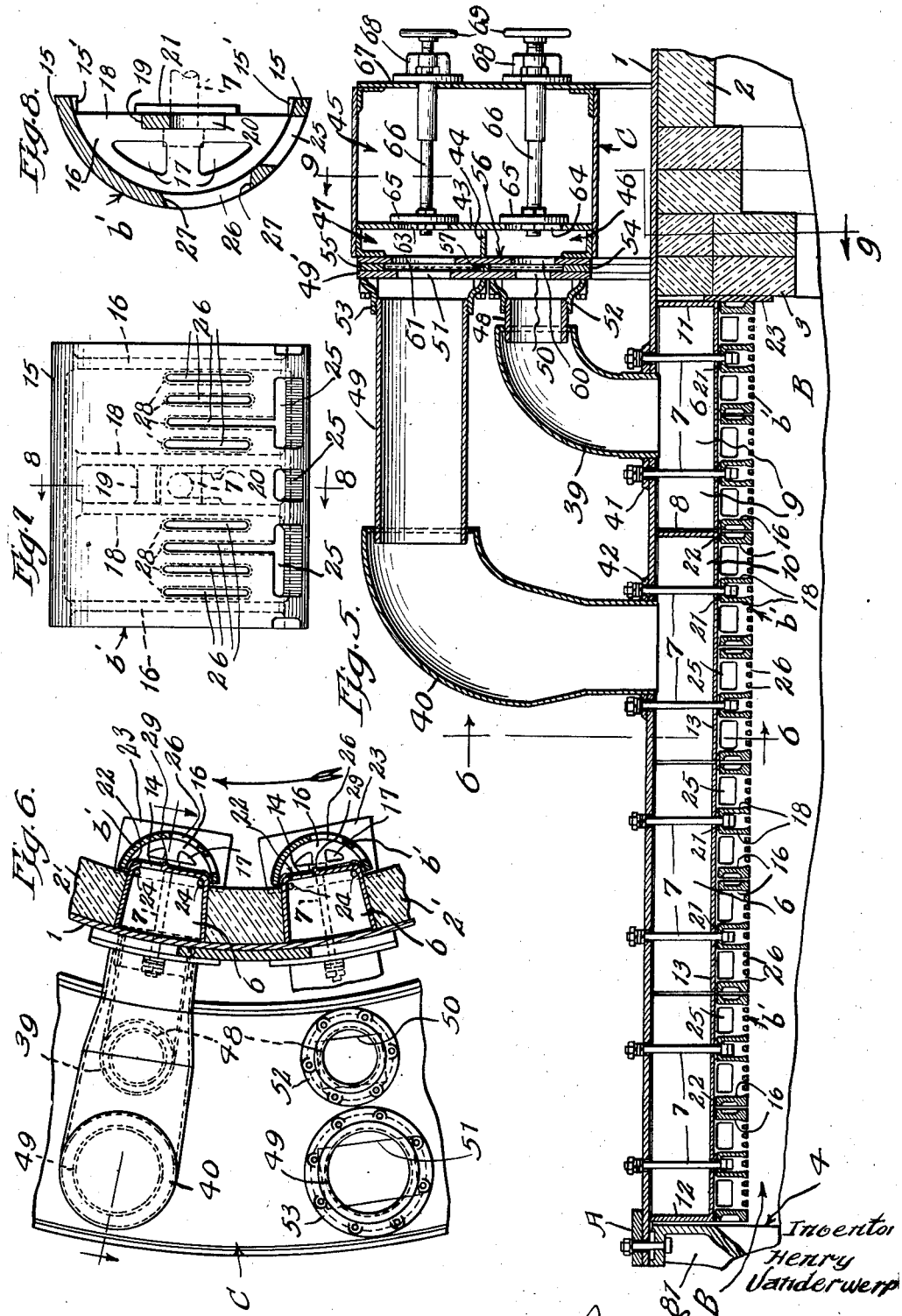
Inventor
Henry Vanderwerp
By Geo. E. Wold. Atty.

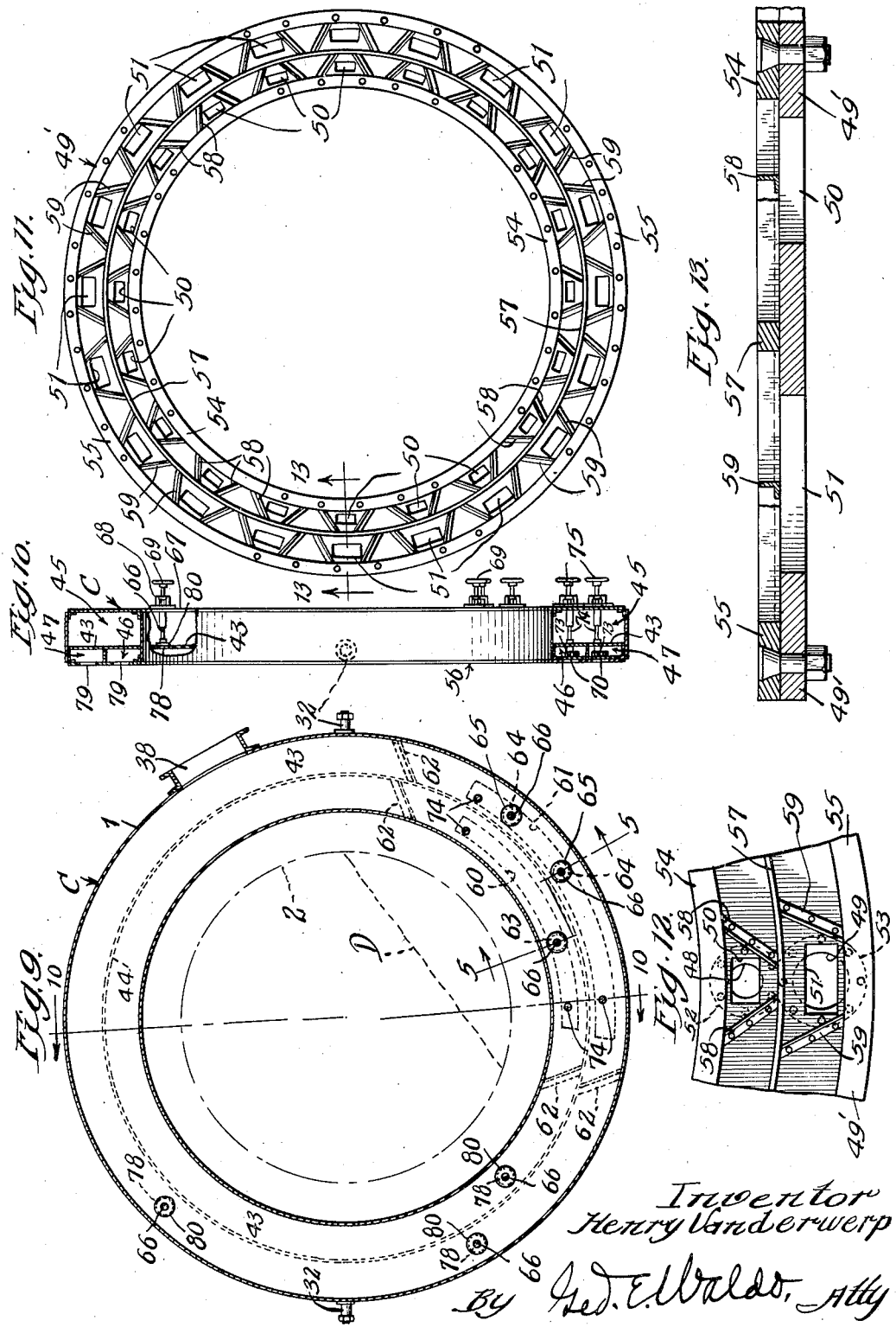

Oct. 11, 1938.  H. VANDERWERP  2,132,710
APPARATUS FOR PRODUCING CEMENT CLINKER
Filed March 20, 1937  6 Sheets-Sheet 6
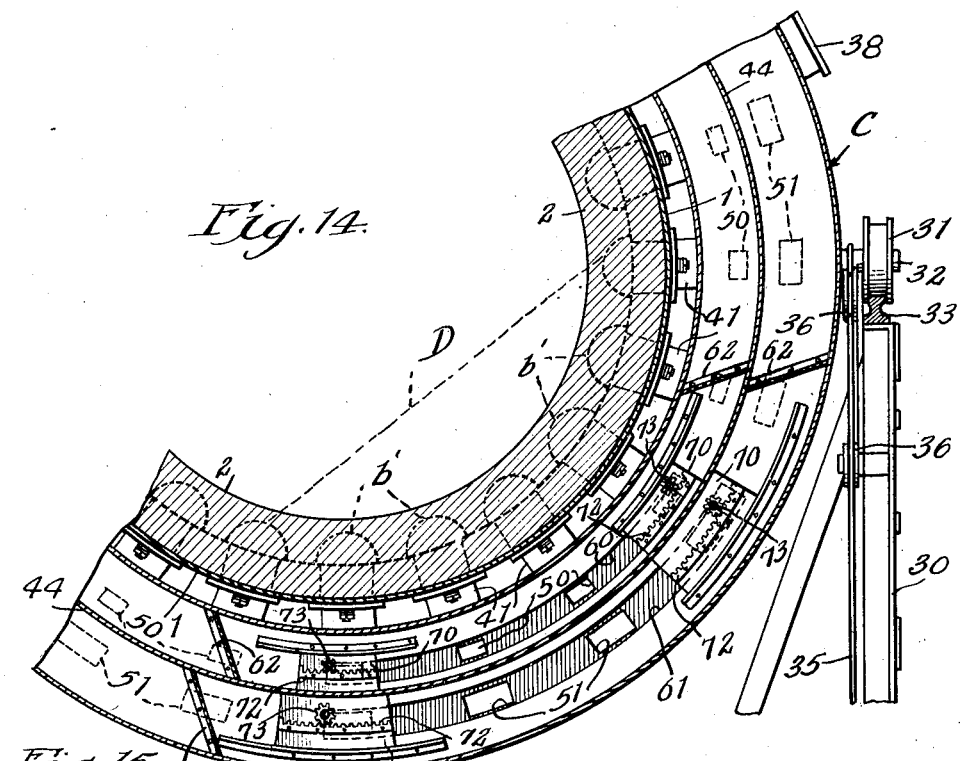
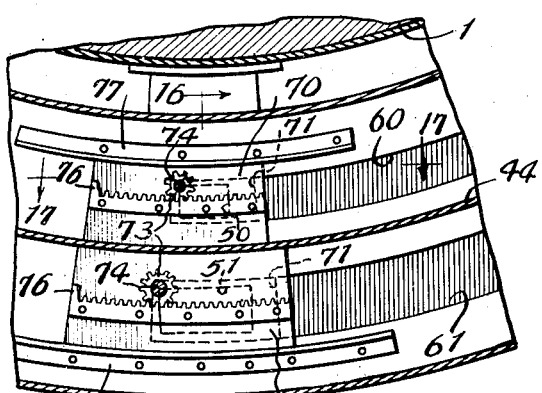
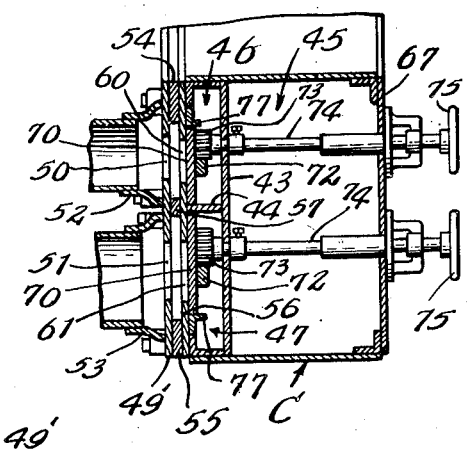
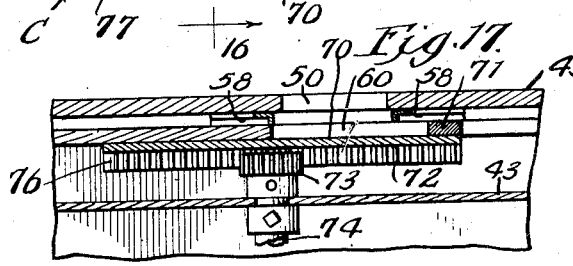
Inventor:
Henry Vanderwerp.
By Geo. E. Waldo, Atty.

Patented Oct. 11, 1938

2,132,710

UNITED STATES PATENT OFFICE 2,132,710

APPARATUS FOR PRODUCING CEMENT CLINKER

Henry Vanderwerp, Cleveland, Ohio

Application March 20, 1937, Serial No. 132,052

20 Claims. (Cl. 34—6)

This invention relates generaly to improvements in apparatus for and methods of producing cement clinker and has special reference to rotary kilns of the type commonly used for this purpose, and relates particularly to combination heat recuperator and cement clinker coolers for such kilns, designed and adapted for pre-heating air delivered to the kiln for combustion purposes, and at the same time cooling the clinker between the point at which the clinker leaves the burning or sintering zone, and the discharge end of the kiln.

In many respects this present application is a continuation of or a substitution for my co-pending application filed November 20, 1934, Serial No. 755,397.

The object of the invention has to do primarily with increasing the friability and grindability of the clinker, reducing the size of the nodules thereof and changing the constituents of the clinker whereby, as applied in practice, a stronger and more durable concrete will be produced.

Further objects of the invention are to provide an improved construction and arrangement of the means for controlling the volume of air supplied to the kiln for supporting combustion of the fuel charge, for regulating the temperature of the kiln, and for cooling the clinker before it is discharged from the kiln and to prevent cracking and breaking of metallic portions of the recuperator and cooler, exposed within the kiln which might be caused by contraction and expansion due to the high temperatures and excessive variations in temperatures to which they are subjected in operation.

What I now consider preferable apparatus for the practice of my improved method, consists of a rotary kiln equipped with the herein described novel combination recuperator and cooler for pre-heating air delivered to the kiln, for combustion purposes, for cooling the clinker before it is discharged from the kiln and especially arranged and adapted to apply the cooling air to the clinker just as it leaves the sintering and burning zone so that the first several hundred degrees of temperature drop of the clinker will be very quickly effected. In other words, to, in effect, air quench the clinker, as it leaves the sintering and burning zone and while it is yet in a semi-viscous condition, to suddenly reduce its temperature several hundred degrees, and further to more gradually reduce its temperature to a point where it can be handled without undue destructive effect on the handling equipment.

Besides the novel method of cooling the sintered clinker, the invention comprises the various features, combinations of features and details of construction and operation hereinafter fully described and claimed.

In the accompanying drawings, in which the invention is fully illustrated;

Figure 1 is a top plan view of the material discharge end of a rotary kiln to which a combination recuperator and cooler embodying my invention and improvements is applied.

Figure 2 is a side elevation of the structure shown in Fig. 1.

Figure 3 is a fragmentary sectional elevation, substantially on the line 3—3 of Figs. 1 and 4.

Figure 4 is a sectional elevation substantially on the line 4—4 of Figs. 1 and 3.

Figure 5 is an enlarged, fragmentary, radial, sectional view substantially on the line 5—5 of Figs. 3, 6 and 9.

Figure 6 is a fragmentary, transverse vertical section on the line 6—6 of Fig. 5.

Figure 7 is an elevational view of one of the tuyères as seen from the inside of the kiln.

Figure 8 is a vertical section of a tuyère on the line 8—8 of Fig. 7.

Figure 9 is a vertical section of the wind-box on the line 9—9 of Figs. 4 and 5.

Figure 10 is a sectional view of the wind-box substantially on the line 10—10 of Fig. 9, broken away in part.

Figure 11 is a detached face view of the blast-ring for supplying air from the wind-box to the tubular connections.

Figure 12 is a fragmentary, enlarged, face view of a portion of the blast ring showing the blast openings and the connections to the kiln shell.

Figure 13 is an enlarged, radial section of the blast ring on the line 13—13 of Fig. 11.

Figure 14 is a fragmentary, vertical, sectional view of the wind-box and kiln substantially on the line 14—14 of Fig. 4.

Figure 15 is an enlarged, fragmentary, sectional view of the wind-box similar to Fig. 14.

Figure 16 is an enlarged, radial section of the wind-box on the line 16—16 of Fig. 15.

Figure 17 is a fragmentary, substantially circumferential section on the line 17—17 of Fig. 15.

Describing the invention with reference to the drawings, in which for purposes of clear and definite illustration, I have shown my invention and improvements applied to a well known type of kiln for producing cement clinker, designated as a whole A, and which comprises a usual rotary shell 1, having a lining 2 of suitable refractory material, which for reasons presently apparent, terminates as shown at 3, at a distance from the clinker discharge end 4 of the kiln.

The kiln is mounted for rotation on an axis slightly inclined to the horizontal and by suitable means commonly used, but not shown.

Considered generally, all of the foregoing features and devices are old and well known in the art, and will readily be understood by persons familiar with the construction and operation of such apparatus, from an inspection of the drawings without a description thereof in detail.

To effect the object of the invention, as it relates to the provision of a combination recuperator for pre-heating air supplied to the kiln for combustion purposes, and for cooling clinker about to be discharged from the kiln, circumferentially spaced, longitudinally disposed air flues 6 are provided on the inner surface of the shell 1 of the kiln A, between the lower end of the lining 2 and the discharge end 4 of the kiln, and which form a series extending entirely around the kiln. For purposes of convenient reference, said combination recuperator and cooler is designated as a whole, B.

In what I now consider preferable construction, see particularly Figs. 3 to 5, said air flues 6 are formed by hollow trough-like metal members designated as a whole b, preferably made of suitable heat resisting steel alloy, corresponding sides of which are open, as shown, and which are adapted to be secured to the inner side of the shell 1 by bolts 7, as shown, and as presently described, with the edges of their lateral sides in contact with the inner surface of the shell 1, which closes the open sides thereof and, also, forms the outer sides of the flues. As shown, the flues 6, extend from the end 3 of the lining of the sintering zone of the kiln to its discharge end 4. In the preferable construction shown, said flues are divided between their ends by radial partitions 8 into relatively short sections 9 at their inner ends and relatively long sections 10, extending from the ends of the short sections to the discharge end 4 of the kiln. The remote ends of the flue sections 9 and 10 are closed, respectively, by plates 11 and 12, otherwise, said flue sections 9 and 10 are open from end to end. As described, the sections 9 and 10 of the flues 6 form air chambers in the recuperator and cooler forming part of the lining of the kiln.

Also, as said flue members b are installed for use, the areas of the shell 1 of the kiln exposed in the spaces between adjacent flues—and which otherwise would be exposed directly to the intense heat within the kiln, are lined, as shown at 2'. Said lining, may be of the same general character as the lining 2 used for lining other parts of the kiln, but may consist of any suitable or desired material. As shown, the linings 2' are of substantially the same thickness as that of other parts of the kiln, the relations being such that the surfaces thereof exposed within the kiln will be positioned between the sides of the flues remote from the shell 1 of the kiln, protecting said members b from the excessive operating temperatures in the kiln, to which they would otherwise be exposed.

As shown the flue members b are provided in their inner or bottom walls 13 with longitudinally extending air outlet openings 14.

The direction of rotation of the kiln is shown by the arrow on Fig. 3 and the openings 14 are so placed in the bottom walls 13 of the flue members b that, as they pass beneath the sintered material, indicated at D, Fig. 3, they are located in the upper parts of said bottoms 13.

For the purpose of directing the cooling air entering the kiln through said openings into the material to be cooled and to prevent the material from falling through said openings into the flues 6, tuyère members b' are mounted on the exposed bottoms of the flue members b so as to cover same. Said tuyère members b' are made of suitable heat resisting steel alloy, are substantially semi-cylindrical in shape and hollow, being open on their sides adjacent the flue members b and are provided on their longitudinal edges with flanges 15 which, as assembled for use, embrace the longitudinal edges of the bottoms of the flue members b and position said tuyère members on said flues. Fitting lugs 15' are provided on the flanges 15 for accurately fitting the tuyère members b' on the flue members b.

The tuyère members b' have end walls 16 which are spaced inwardly from the ends of said members and are provided with air outlet openings 17. Also, each of said tuyère members is provided with a pair of transversely extending walls 18 arranged midway between their ends and connected by a flat connecting flange 19 at their middle portions which is provided with an open ended slot 20 to receive a securing bolt 7. By this construction both the flue members b and the tuyère members b' are secured by the bolts to the shell 1 of the kiln. Filler washers 21 are arranged on the bolts 7 between the flanges 19 and the flue members b so that the tuyère members b' can be clamped tightly by the bolts 7 without any undue strain. Such method of securing the tuyère members by a bolt centrally positioned leaves said tuyère members free to expand and contract in response to the great changes in temperature to which they are subjected in use, without setting up stresses which might tend to crack or destroy them. The heads of the bolts 7 fit loosely between the walls or webs 18 and the bolts are inserted into position through the flue members b and the shell of the kiln from within the kiln, thus preventing turning of the bolts when the nuts, on their outer ends are tightened.

As best shown in Fig. 5 the flue members b are separated to allow for expansion and contraction, and the slots or openings at the ends of the flue members register with the slots between the ends of the tuyère members. Cover strips 22 are arranged to cover the slots between the ends of the flue members b and thus prevent the air passing directly through said slots into the kiln. In assembling the various members on the shell 1 to build a recuperator and cooler, the flue members b having been placed in position, the cover strips 22 are placed on them to cover the spaces between their ends, and when the tuyère members are bolted in position, the fitting lugs 15' on the inner lateral edges of the tuyère members, rest on the cover strips 22 and clamp them tightly in position. As shown, the end of the tuyère member adjacent the end 3 of the kiln lining 2 is closed by a flat plate 23 which may be secured in position by any suitable means such as rivets 24 securing it to the plate 11 which closes the adjacent end of the adjacent flue member b.

As described, the tuyère members b' are substantially semi-cylindrical in shape and project within the kiln and assuming that the kiln rotates in the direction indicated by the arrow, Fig. 3, said tuyère members would lift the material in the kiln as they pass beneath same. The rounded shape of the tuyère members, particularly the leading sides of same, serve to lift the material and also let the material slide freely off of same.

As shown, the tuyère members are provided with various air outlets through which the air enters the kiln and these outlets are arranged in the following or rear sides of said members, it being obvious that if the air outlets were provided in the leading sides of said members particles of clinker would drop through said openings and tend to clog the air passages. As shown, said tuyère members are provided with air outlets which comprise a series of openings 25 adjacent the lower edges of said members, as shown in Fig. 6. These are the main air outlets and tend to direct the air rearwardly substantially parallel with the wall of the kiln. In addition to these main air outlets said tuyère members are provided with a series of narrow slots 26 which extend transversely of the tuyère members from a point adjacent the upper sides of the openings 25 to substantially the transverse middle line of the member. The air passing through these slots serves to prevent overheating and oxidation of the tuyère members in operation. To relieve the tuyère member from internal expansion and contraction stresses, one of the slots 26 in each end portion of the tuyère member extends through and connects with the adjacent opening 25.

As best shown in Fig. 8, the end walls 27 of the slots 26 are flared inwardly, and as indicated in Fig. 7 by the dotted lines 28 the side walls of said slots are also flared inwardly so as to permit particles of clinker entering said slots to pass freely through and not clog same.

It will be seen that, as shown and described, the air outlets in the flue members b direct the air toward the upper closed portions of the tuyère members b' and it is then directed downwardly by the wall of said closed portions toward the air outlets 25 in the following sides of the tuyère members.

It has been found that this method of applying the air is very effective in obtaining the results desired and also reduces to a minimum the quantity of fine clinker particles which enter the air passages.

As a further means for preventing the clinker or clinker dust entering through the air outlets 14 of the flue members b a projecting lip 29 is provided at the lower or following edges of the openings 14 as shown in Fig. 6, on the flue members b, which prevents clinker particles, which may enter the tuyère members, sliding freely into the flue members, particularly on the side of the kiln opposite to that shown in Fig. 3. With a recuperator B, comprising the elements described and mounted in the manner and relation specified, it is obvious, that, under usual operating conditions, any tendency for granular material to pass from the kiln into the air passages of the recuperator and cooler will be negligible.

In accordance with the present invention, air under pressure is adapted to be supplied to the recuperator and cooler B, and discharged therefrom into the kiln A, by means as follows:—Surrounding the shell 1 of the kiln in proximate relation to the zone thereof to which the recuperator and cooler is applied, and in spaced relation to the shell of the kiln, is an annular wind-box designated as a whole C, which, as shown, is movably supported on fixed frames or standard 30, erected at opposite sides of the kiln, so as to be movable in both directions, axially of the shell 1, of the kiln. As shown, said wind-box is supported directly by wheels 31 rotatably mounted on opposite sides thereof—being, as shown, mounted on studs or trunnions 32 secured thereto—and which are arranged to run on tracks 33 supported on the frames or standards 30, the treads of which are inclined at substantially the same angle and in the same direction as the axis of rotation of the shell of the kiln. For reasons presently apparent, said wind-box is maintained yieldingly at the limit of its movement in the direction of the discharge end of the kiln, by means of weights 34 suspended by cables 35 secured to opposite sides of said wind-box and which run over sheaves 36 rotatably mounted on brackets 37 secured to the frames or standards 30, as shown.

In operation, air under pressure is supplied to the wind-box C through connection of a flanged fitting 38 thereon with a source of air supply, not shown, and from said wind-box to the recuperator and cooler B, by means as follows:—

Mounted on the shell 1 of the kiln are air distributing connections, constructed and arranged for delivering air from a source of supply, as the wind-box C, to the recuperator and cooler B, and thence to the interior of the kiln.

In what I now consider preferable construction, said air distributing connections are made of suitable sheet metal in the form of elbows, and, as shown, comprise two series, the units of which are arranged one inside of the other,— the elbows of the inner series, designated 39, being relatively smaller and shorter than the units of the outer series, designated 40. The elbows 39 of the inner series, communicate with the shorter flue sections 9 and those of the outer series, with the longer flue sections 10.

Said tubular connections 39 and 40 are preferably connected to the shell of the kiln by means of sheet metal collars or flanges 41 and 42 secured thereto, see Fig. 5, which conform to the curvature of the shell 1 and, preferably are welded to said connections. To save fitting, the ends of said distributing connections 39 and 40, secured to the shell of the kiln, are loosely fitted to holes formed in said shell and leakage of air is prevented by welding said flanges to the shell to form tight joints.

The wind-box C is made of suitable sheet metal, is rectangular in cross-section—its front and rear sides being flat and substantially parallel and positioned in substantially parallel planes, which, respectively, are substantially perpendicular to the axis of rotation of the shell of the kiln, and which, excepting for limited bodily movement thereof axially of the shell of the kiln, is stationary.

The interior of the wind-box C is divided by a transverse diaphragm 43 and a longitudinal partition 44 into three circumferential compartments 45, 46 and 47. The compartment 45 is relatively large and communicates directly with the air supply fitting, and also with the compartments 46 and 47, through suitable valve controlled openings provided in the diaphragm 43, as hereinafter fully described. The inner compartment 46 communicates with the inner air distributing connections 39, and the outer compartment 47 communicates with the outer air connections 40 by means of nipples 48 and 49 respectively, welded or otherwise rigidly secured in holes in the ends of said air connections proximate the wind-box, and which project into said connections a short distance, say for usual purposes, about two inches, thereby providing traps which will operate, in an obvious manner, to prevent granular material from passing from said air distributing connections into said nipples and thence into the contacting wear surfaces on said connections and wind-box, presently described.

As shown the means of communication between the wind-box C and the tubular connections 39 and 40 includes a blast-ring 49' secured to the outer ends of the nipples 48 and 49, provided with two circumferential series of ports 50 and 51 for supplying air to the connections 39 and 40, respectively,—the bores of the outer series of nipples 49 being in open communication with the ports in the blast-ring 49' arranged to communicate directly with the compartment 47 of the wind-box, and the bores of the inner series of nipples 48, being in open communication with ports of the blast-ring 49' arranged to communicate directly with the compartment 46 of the wind-box, the arrangement being such that both of said series of ports and thus both series of nipples 48 and 49 will be brought into communication with ports formed in the wind-box, in continuous succession during operation, by rotation of the kiln A.

In the preferable construction shown, the blast-ring 49' is secured to the nipples 48 and 49 in such manner that it will have capacity for limited adjustment endwise thereof to provide for adjusting the positions of the tubular connections 39 and 40 and blast-ring 49' relative to each other. To provide for such adjustment, the nipples 48 and 49 have screw-threaded engagement with the bores of tubular fittings 52 and 53, respectively, detachably secured to said blast-ring and arranged to be secured thereto in different angular adjustments. As shown, said fittings are secured to the blast-ring 49' by means of bolts inserted through holes formed in base flanges on said fittings, which have threaded engagement with corresponding holes in the blast-ring 49', all of said holes being equally spaced circumferentially — say sixty degrees (60°)—whereby said bolts will be interchangeable in said holes, thus providing for securing said fittings to said blast-ring in different angular positions, and providing for limited adjustment of the wind-box C and the tubular connections 39 and 40 towards and from each other, to facilitate installation of said connections.

In accordance with the invention, see Figs. 4, 5 and 13, leakage of air from the wind-box C past the blast-ring 49', is prevented by means of annular wear rings 54 and 55, secured respectively to the inner and outer marginal edges of said blast-ring, and which extend entirely around the same, one inside and the other outside of the ports or openings 50—51, and with which the outer side of the rear wall 56 of the wind-box—which for purposes of convenient reference, may be designated the wear-plate—is held yieldingly in contact by the weights 34 applied to said wind-box, which, necessarily, must be sufficiently heavy to counteract the force of an unbalanced air pressure in the wind-box tending to force said wind-box away from said blast-ring 49' and the wear-rings 54, 55, thereon, which would operate, in an obvious manner, to cause leakage of air between the rear wall or wear plate 56 of the wind-box and said blast-ring.

As shown the inner ports 50 are blocked off from the outer ports 51 in the space defined by said wear rings 54, 55 by an annular ring 57 which is equal in height with said wear rings and arranged between the inner ports 50 and the outer ports 51.

As shown, also, the ports or openings 50—51 in the blast-ring 49', with which the open ends of different tubular connections 39 and 40 communicate, as heretofore explained, are blocked-off at both sides by suitable barriers 58, 59 arranged to confine air passing from the wind-box to a tubular connection, to prevent it from passing laterally or circumferentially around the space defined by the wear-rings 54, 55 between the blast-ring 49' and the proximate wall of the wind-box, and entering connections other than those which are in communication with the port or opening in the wind-box designated for supplying air under pressure to said tubular connections from said wind-box in usual operation, and which would result in seriously impairing operation of the kiln, particularly as it relates to pre-heating air intended for combustion purposes and for cooling clinker discharged from the kiln. What I now consider preferable barriers for the purpose, consist of angle-bars made of relatively soft metal, as brass, a flange of each of which is riveted or otherwise secured to the blast-ring 49' and the other flanges of which, respectively, extend substantially at right angles to the side of said blast-ring to which said angle bars are secured, the initial height of said projecting flanges being slightly greater than the thickness of the wear-rings 54, 55. Thus, as first installed, the outer edges of said flanges will contact with the adjacent wall of the wind-box C and will prevent contact of the wear-rings therewith but will quickly be worn down to a height equal to the thickness of said wear rings by rotation of the shell of the kiln. As shown, also, said angle-bars 58—59 are installed with their opposite ends in contact with said wear-rings 54, 55 and the middle ring 57 so as to form tight joints therewith. As shown, also, the angle-bars which thus block-off the ports in said blast-ring, converge outwards at angles of about 45 degrees to each other, and symmetrically with reference to radial lines of said blast-ring through the centers of said ports, respectively.

In accordance with the invention, see Figs. 14 and 15, air under pressure is delivered to the connections 39 and 40 through segmental ports 60 and 61, respectively, formed in the rear wall or wear plate 56 of the wind-box. Said ports form arcs of circles, the axes of which are substantially coincident with the axis of the blast-ring 49', and are positioned radially to register with the ports 50 and 51, respectively, in the blast-ring 49'.

As shown, the ports 60 and 61 are positioned substantially symmetrically, circumferentially of the shell 1 of the kiln, with the angle of repose of the body of clinker D therein, in operation, the relation being such that the tuyère members b' which are in communication with said ports 60 and 61 at any given time, will be covered by the deep body of clinker which over-lies the sector of said angle of repose. As shown also, said ports 60—61 are of such length that more than one tubular connection will communicate therewith at the same time, said segmental ports being made sufficiently large to insure an adequate supply of air to the tubular connections 39 and 40 to meet contemplated operating requirements.

Beyond the outer ends of said segmental ports 60 and 61 the circumferential chambers 46 and 47 are blocked off by radial partitions 62 to prevent the supplied air from circulating around through said chambers and entering the kiln at other subsidiary ports to which the air is otherwise controlled.

The portions of the chambers 46 and 47 between the radial partitions 62 and which portions are in communication with said segmental ports 60 and 61, are supplied with air under pressure from the air supply chamber 45 through a port 63 in the diaphragm 43 for the inner segmental port 60 and through ports 64 in the diaphragm 43 for the outer segmental port 61. These ports are controlled by disk valves 65 carried on the ends of valve stems 66 which project out through the forward wall 67 of the wind-box and are mounted, for operation, in suitable fixed guides 68 with which said stems have the usual screw-threaded engagement, and are provided with suitable hand wheels 69 on their outer ends, as usual, for operation.

For obtaining the best results in applying the cooling air to the bed D of clinker through the elongated ports 60 and 61 it is sometimes desirable to change the locations of said ports relatively to the angular position of the bed D of the clinker in the recuperator and cooler or to lengthen or shorten said ports. For this purpose sliding dampers 70 are provided at the ends of said segmental ports which can be moved inwardly or toward each other to shorten the ports, or moved outwardly to lengthen the ports and similarly to change the locations of the ends of said ports and whereby the relative angular positions of the ports can be adjusted as may be necessary in operation, to secure the best results.

The sliding dampers 70 being all alike, a description of one will suffice for all. Each damper 70 comprises a sheet metal plate arranged at one end of one of the segmental ports 60—61 spanning the port and resting on the inner surface of the forward or wear-plate 56 of the wind-box. The damper has a filler bar 71 at its forward end which extends across the associated segmental port and stops off said port, and which bar 71 contacts with the outer end of the port when the damper is moved outwardly to its limit and thus serves as a stop to limit the outward movement of the damper.

Any suitable means may be provided for moving said dampers and retaining them in their adjusted positions such, for instance, as a toothed rack 72 on the back of the damper which is engaged by a toothed pinion 73 secured on the inner end of an operating shaft 74 mounted for rotation in the diaphragm 43 and the forward wall 67 of the wind-box, and provided on its outer end with a hand wheel 75 by which it can be rotated. Any suitable means may be provided to limit the port closing movement of the damper to prevent the uncovering of the outer end of the segmental port when the damper is being moved inwardly, such for instance as a stop projection 76 at the outer end of the rack 72 which will engage the pinion 73 and obviously limit the movement of the damper. The dampers 70 fit loosely edgewise between the partition 44, which separates the chambers 46 and 47, and a suitable guide member, such as an angle member 77 secured to the wear-plate as best shown in Fig. 15. The dampers 70 are held close enough to the wear-plate by the pinions 73, which, as shown, are positioned between the dampers and the diaphragm 43, so that the air pressure in the chambers 46 and 47 will properly seat the dampers tightly against the wear-plate 56.

In operation the dampers 70 can be adjusted while the kiln is in operation and the effect of the change can be observed through the discharge end of the kiln so that the best results can be obtained.

Further, the same observation and control can be had of the quantity of air delivered to the kiln through the tubular connections 39 and 40, as it is changed by manipulation of the air supply valves 63 and 64.

As shown, see particularly Fig. 9, the diaphragm 43 of the wind-box is provided with ports 78, separate from the ports 60—61, which connect the compartments 46 and 47 with the compartment 45 of the wind-box, and formed in the rear wall or wear-plate 56 of the wind-box, are ports 79, see Figs. 9 and 10, with which the ports 50 and 51 in the blast ring 49', are adapted to be brought into communication in continuous succession, in operation. The ports 78 are controlled by hand valves 80.

With the construction described it is obvious that cool air may be supplied to the kiln through the tuyère members not covered by the body of the clinker D in said kiln, to prevent overheating of said tuyère members.

It is obvious that the number of the ports 78 may be varied as desired.

In accordance with usual practice, the kiln comprises what is known generally as a firing hood for closing its clinker discharge end. However, such firing hood forms no part of the present invention and no firing hood is shown, though a hood suitable for the purpose can readily be supplied by mechanics familiar with such structures.

In accordance with usual practice, the kiln A comprises a nose-ring 81 secured to the clinker discharge end of the shell 1 of the kiln, said nose-ring extending inwards beyond the inner surface of the pre-heater and cooler B, as shown, in such relation as to increase the thickness of the bed of clinker in the kiln, as will be readily understood.

As best shown in Fig. 5 the lining 2 of the sintering zone of the kiln is contracted as shown at 3, where the clinker flows over into the combination recuperator and cooler, in order to maintain a desired depth of clinker in the burning zone. In practice the sintered clinker, as it advances into the recuperator and cooler flowing over the wall 3, has a temperature of approximately 2600° F. and is in what may be termed a semi-viscous condition and it is a particular object of the invention to effect a temperature drop of several hundred degrees at this point as rapidly as possible. In other words it is important, in order to obtain the full advantage of the invention, to air quench the hot clinker to drop the temperature thereof from its maximum down several hundred degrees as rapidly as possible. I am enabled to accomplish this result by means of the first section 9 of the recuperator and cooler to which cooling air is delivered through the tubular connections 39.

I have found that this very rapid temperature reduction of the clinker results in the production of nodules of clinker much smaller than those heretofore produced for a given composition.

Another very important advantage attained is, that on account of the relatively small size of nodules of clinker, the quality is substantially uniform throughout the individual nodules.

Furthermore the nodules being much smaller than that ordinarily produced, materially reduces the cost of grinding to produce the cement which is the ultimate object.

I claim:—

1. A kiln comprising a rotary shell, a lining therefor, including a combination recuperator and cooler for pre-heating air supplied to the kiln and cooling material discharged therefrom, said recuperator and cooler consisting of trough-shaped members secured to the shell of the kiln with the edges of their open sides in contact therewith, and arranged to form a series of flues spaced apart circumferentially of the kiln, said members provided with openings for discharging air into the kiln, tuyère members supported on said flues and which extend over said openings, and means for securing said flue members and tuyère members to the shell of the kiln.

2. The kiln specified in claim 1, the leading sides of the tuyère members of which form ledges for raising material in the kiln in operation, and the following sides of which are provided with ports through which air is discharged therefrom into the kiln.

3. The kiln specified in claim 1, the tuyère members of which have flanges arranged to embrace the sides of the flues on which they rest, respectively, to thereby prevent lateral displacement of said tuyère members relative to said flues.

4. The kiln specified in claim 1, and the spaces between the flues filled with refractory lining material.

5. The kiln specified in claim 1, and air connections, means for mounting said connections on the shell of the kiln and providing communication between said connections and the flues of said recuperator and cooler, a wind-box, an air supply connection thereto, and means controlled by rotation of said kiln providing communication between said wind-box and said connections.

6. The kiln specified in claim 1, the recuperator and cooler of which is positioned between the sintering zone and the clinker discharge end of the kiln.

7. A kiln comprising a rotary shell, a lining therefor, including a recuperator and cooler for preheating air supplied to the kiln and for cooling material discharged therefrom, and means for supplying air under pressure to said recuperator and cooler, comprising air distributing connections on the shell of the kiln constructed and arranged to communicate with flues of said recuperator and cooler, a blast-ring provided with ports secured to the air distributing connections on the shell of the kiln with said ports in communication with said air distributing connections, respectively, said ports being arranged in a circular series substantially concentric with the shell of the kiln, a wind-box, a diaphragm which divides said wind-box into compartments, said diaphragm provided with a blast opening, the rear wall of the wind-box being provided with a segmental blast opening which communicates with said blast opening in the diaphragm, and dampers which close the ends of said segmental blast opening the relation being such that said ports are brought into communication with said segmental blast opening in continual succession during operation.

8. A kiln comprising a rotary shell, a lining therefor, including a recuperator, and cooler for preheating air supplied to the kiln and for cooling material discharged therefrom, and means for supplying air under pressure to said recuperator and cooler, comprising air distributing connections on the shell of the kiln constructed and arranged to communicate with flues of said recuperator and cooler, a blast-ring provided with ports secured to the air admission ends of said air distributing connections with the ports thereof in communication with said air distributing connections, a wind-box mounted in association with said kiln, means for supplying air under pressure to said wind-box, means for maintaining the rear wall of said wind-box in contact with said blast-ring, in operation, and means controlled by rotation of the shell of the kiln for supplying air from said wind-box through the ports of the blast-ring to said distributing connections on the kiln and thence to said recuperator and cooler.

9. A kiln comprising a rotary shell, a lining therefor, including a recuperator and cooler for preheating air supplied to the kiln and for cooling material discharged therefrom, and means for supplying air to said recuperator and cooler, comprising air distributing connections and a wind-box, a diaphragm which divides the wind-box into compartments, said diaphragm provided with a valve controlled port and the rear wall of the wind-box being provided with a segmental blast-opening in communication with said port, means for closing the space between said diaphragm and the rear wall of the wind-box beyond the ends of said segmental blast-opening, and dampers which close the end portions of said blast opening, said dampers being separately adjustable to provide for varying the operative length of said blast-openings and its position relative to the angle of repose of the bed of material in the kiln.

10. A kiln comprising a rotary shell, a lining therefor, including a recuperator and cooler for preheating air supplied to the kiln and for cooling material discharged therefrom, and means for supplying air to said recuperator and cooler, comprising air distributing connections and a wind-box, a diaphragm which divides the wind-box into compartments, said diaphragm provided with ports and the rear wall of the wind-box being provided with segmental blast-openings in communication with said ports, means beyond the ends of said segmental openings for blocking off the space between said diaphragm and the rear wall of the wind-box which contains said segmental blast-openings, and adjustable dampers for varying the effective lengths and relative positions of said segmental openings.

11. A kiln comprising a rotary shell, a lining therefor, including a recuperator and cooler for preheating air supplied to the kiln and cooling material discharged therefrom and air distributing connections thereon, a blast-ring provided with ports secured to the air distributing connections on the shell of the kiln with said ports in communication with said distributing connections, respectively, said ports being arranged in a circular series substantially concentric with the shell of the kiln, a wind-box, a diaphragm which divides said wind-box into compartments, said diaphragm provided with ports, and the rear wall of the wind-box being provided with segmental blast-openings in communication with said ports, dampers which close the ends of said segmental openings, said dampers being separately adjustable to provide for varying the operative length of said segmental openings and their positions relatively to the angle of repose of the material in the kiln.

12. A hollow tuyère member of the general type shown, comprising a closed outer side which is exposed within the kiln, and a following side provided with port openings and which, in use, will be subjected to extreme changes in temperature, and means to prevent in whole or in part cracking or breaking of said tuyère member under the stresses developed therein by expansion and contraction, incident to such heat changes, consisting in the provision in the closed outer and following sides of said tuyère block of a slot, or slots, which cut into a port opening or openings in the following side thereof.

13. A kiln comprising a rotary shell, a lining therefor including a combination recuperator and cooler for pre-heating air supplied to said kiln and cooling material discharged therefrom, means for supplying air under pressure to said recuperator and cooler, comprising air distributing connections on the kiln constructed and arranged to communicate with said recuperator and cooler, a blast-ring provided with ports secured to the air admission ends of said air distributing connections, with the ports thereof in communication with said distributing connections, respectively, a wind-box mounted in association with said kiln, a diaphragm which divides said wind-box transversely, and means for maintaining the rear wall of said wind-box in contact with said blast-ring, in operation, the rear wall of the wind-box and the diaphragm being provided with communicating ports, and manually operable valves which control the flow of air from the wind-box through said ports, the relation being such that rotation of said blast-ring, in operation, will bring the ports therein into communication with ports in the rear wall of the wind-box, whereby cool air may be supplied directly to the kiln at points above the material therein, to prevent over-heating of the portions of the recuperator and cooler exposed within said kiln.

14. A kiln comprising a rotary shell, means for supplying air under pressure thereto, comprising air distributing connections mounted on said shell, a wind-box mounted in association with said kiln, and means providing communication between said wind-box and said air distributing connections, including nipples secured in the walls of said air distributing connections proximate the rear-wall of the wind-box, a blast-ring supported on said nipples having capacity for adjustment axially of the kiln, and means for maintaining the rear wall of the wind-box in contact with the blast-ring, the relation being such that said nipples will project into said distributing connections a sufficient distance to prevent granular material in said distributing connections from working into said nipples and thence between the contacting surfaces of the blast-ring and the rear wall of the wind-box.

15. A kiln comprising a rotary shell, a lining therefor, including a combination recuperator and cooler for pre-heating air supplied to the kiln and cooling material discharged therefrom, said recuperator and cooler consisting of trough-shaped members secured to the shell of the kiln with the edges of their open sides in contact therewith, and arranged to form a series of flues spaced apart circumferentially of the kiln, and provided with air discharge openings on their inner sides, tuyère members supported on said flues and which extend over said openings, and means for securing said flue members and tuyère members to the shell of the kiln, the tuyère members having centrally disposed flanges arranged to rest on the sides of said flues remote from the shell of the kiln and provided with slots, and bolts which extend through said slots and through holes formed in said flue members and in the shell of the kiln.

16. A kiln comprising a rotary shell, a lining therefor, including a recuperator and cooler for preheating air supplied to the kiln and cooling material discharged therefrom, partition means dividing the recuperator and cooler into a plurality of sections, means for supplying air to said recuperator and cooler while the kiln is rotating, including tubular connections on the shell divided into series, one series for each section of the recuperator and cooler, means for supplying air to said series of connections, comprising a wind-box, means on the wind-box adapted to deliver air to different series of said tubular connections, and means on the wind-box for separately regulating the volumes of air supplied to said series of connections.

17. A kiln comprising a rotary shell, a lining therefor, including a recuperator and cooler for preheating air supplied to the kiln and cooling material discharged therefrom, partition means dividing the recuperator and cooler into sections, means for supplying air under pressure to said sections, comprising series of tubular connections on the shell of the kiln, one series for each section, a blast-ring provided with ports and secured to the air admission ends of said tubular connections, a wind-box mounted in association with said kiln, said wind-box provided with inner and outer circumferential air chambers, which respectively, are adapted to deliver air to different series of said tubular connections, and means on the wind-box for separately regulating the volumes of air supplied to each series of tubular connections.

18. A kiln comprising a rotary shell, a lining therefor, including a recuperator and cooler for preheating air supplied to the kiln and for cooling material discharged therefrom, partition means dividing the recuperator and cooler into sections, means for supplying air under pressure to said sections, comprising air distributing connections on the shell of the kiln constructed and arranged to communicate with said sections, respectively, a blast-ring provided with ports secured to the air admission ends of said air distributing connections with the ports thereof in communication with said air distributing connections, a wind-box mounted in association with said kiln, means for supplying air under pressure to said wind-box, means for maintaining the rear wall of the wind-box in contact with said blast-ring, in operation, and means controlled by rotation of the shell of the kiln for supplying air from said wind-box through the ports of the blast-ring to said distributing connections on the kiln and thence to the sections of said recuperator and cooler.

19. A kiln comprising a rotary shell, a lining therefor, including a recuperator and cooler for preheating air supplied to the kiln and for cooling material discharged therefrom, partition means dividing the recuperator and cooler into two sections, a separate set of tubular connections on the shell of the kiln for each of said sections, a blast-ring provided with two circumferential series of ports, respectively in communication with said two sets of connections, means preventing communication between said two circumferential series of ports, a wind-box, a diaphragm which divides the wind-box into compartments, the rear wall of the wind-box being provided with a segmental opening for each series of connections, means to prevent communication between said segmental openings, means for blocking off the ends of the spaces between the diaphragm and the rear wall of the wind-box in which said segmental openings are positioned, adjustable dampers which close the ends of said segmental openings, and valve controlled ports in the diaphragm which communicate with said spaces.

20. A kiln comprising a rotary shell, a lining therefor, including a recuperator and cooler for preheating air supplied to the kiln and for cooling material discharged therefrom, a transverse partition dividing the recuperator and cooler into two sections, means for supplying air under pressure to said recuperator and cooler while the kiln is rotating including tubular elbow connections on the shell of the kiln communicating with said recuperator and cooler, said connections being divided into series, one series for each section of the recuperator and cooler, a blast-ring provided with ports secured to the air admission ends of said connections, with the ports thereof in communication with said connections, respectively, a wind-box mounted in contact with said blast-ring for delivering air to different series of said connections, and means on said wind-box for separately regulating the volumes of air supplied to said series of tubular connections.

HENRY VANDERWERP.